United States Patent [19]

Eshghy

[11] Patent Number: 4,995,145
[45] Date of Patent: Feb. 26, 1991

[54] REDUCTION OF RELAXATION INDUCED TENSION SCATTER IN FASTENERS

[75] Inventor: Siavash Eshghy, Solon, Ohio

[73] Assignee: Allen-Bradley Company, Inc., Milwaukee, Wis.

[21] Appl. No.: 461,633

[22] Filed: Jan. 8, 1990

[51] Int. Cl.$^5$ .............................................. B23Q 17/00
[52] U.S. Cl. ........................................ 29/407; 29/446; 29/525.1; 73/761; 73/862.23; 73/862.24
[58] Field of Search ............... 29/407, 446, 525.1, 29/428; 73/761, 862.23, 862.24; 173/12

[56] References Cited

U.S. PATENT DOCUMENTS

| | | |
|---|---|---|
| 3,973,434 | 8/1976 | Smith . |
| 4,000,782 | 1/1977 | Finkelston . |
| 4,023,406 | 5/1977 | Benz, Jr. . |
| 4,095,325 | 6/1978 | Hashimoto et al. . |
| 4,106,570 | 8/1978 | Eshghy et al. . |
| 4,198,737 | 4/1980 | Eshghy . |
| 4,228,576 | 10/1980 | Eshghy . |
| 4,245,381 | 1/1981 | Eshghy . |
| 4,400,785 | 8/1983 | Wallace et al. . |
| 4,426,887 | 1/1984 | Reinholm et al. . |
| 4,450,727 | 5/1984 | Reinholm et al. . |
| 4,620,450 | 11/1986 | Yamaguchi . |
| 4,685,050 | 8/1987 | Polzer et al. . |
| 4,791,838 | 12/1988 | Bickford et al. . |
| 4,908,926 | 2/1990 | Takeshima et al. .................. 29/407 |

OTHER PUBLICATIONS

"Application and Reapplication of Torque to Threaded Fasteners" AD88-757 S. Eshghy, Fastec West '88 Society of Mfg. Engineers, 1988.
"Now! Three Series of Dyna-Tork Multiple Nutrunner Motors to Chhose From", advertising Chicago Pneumatic, 1978.
"Air Motors for Tightening Threaded Fasteners", Ingersoll-Rand Automatic Production Systems Division, 1978.
"DC Brushless Electric Motor Tichtening Systems", Ingersoll-Rand, Automated Production Systems, 1982.
"Eldy 90", Chicago Pneumatic, Electrical Dyna-Tork Nutrunner System, 1984.
"New Dyna-Tork MultiMode Joint Control System" Chicago Pneumatic 1980.

*Primary Examiner*—Timothy V. Eley
*Attorney, Agent, or Firm*—Quarles & Brady

[57] ABSTRACT

A method of reducing variations in the static torque of threaded fasteners, as measured after a relaxation period, uses an instrumented nutrunner to "break" the joint. Breaking the joint is done by monitoring the torque and angle of the fastener during a torque recovery cycle. The angle of the fastener is advanced until a threshold torque is reached and then the fastener is turned an additional predetermined number of degrees. A static audit may be simultaneously performed by storing torque and angle values. Static torque is distinguished from break away torque by detecting the point of minimum curvature of the subsequently produced torque angle curve.

8 Claims, 4 Drawing Sheets

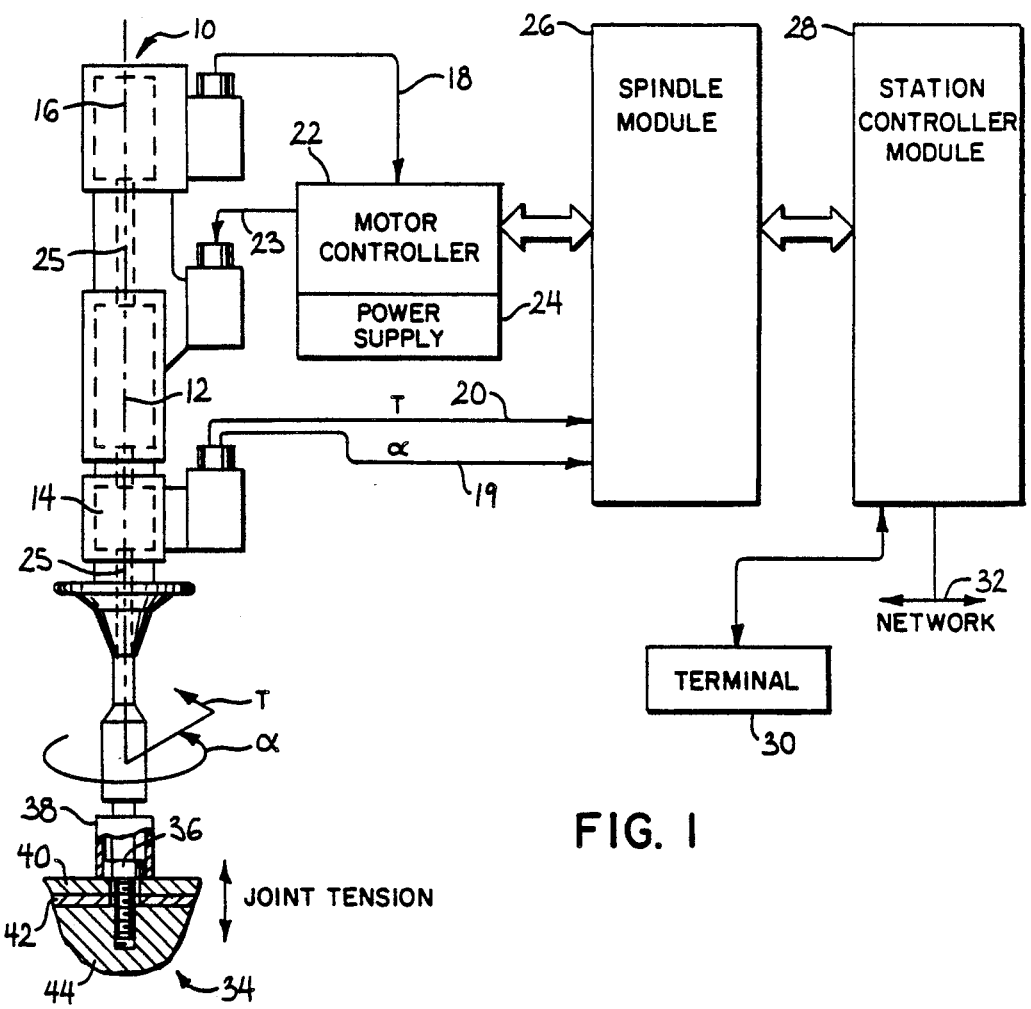
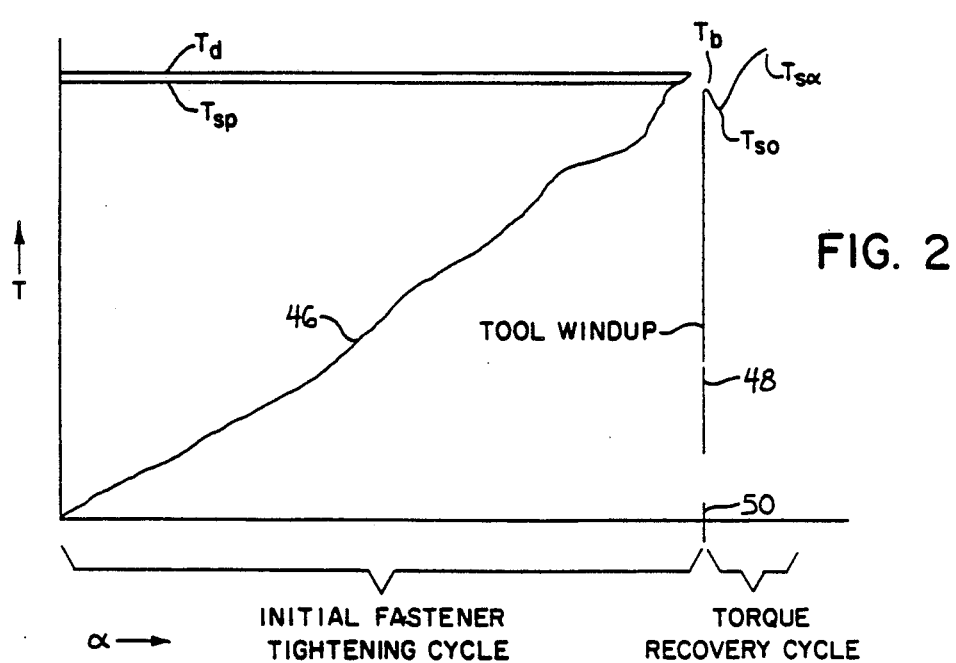

PRE RECOVERY

TORQUE RECOVERY

TORQUE AUDIT

REDUCTION OF RELAXATION INDUCED TENSION SCATTER IN FASTENERS

BACKGROUND OF THE INVENTION

This invention relates to tightening methods for threaded fasteners and in particular to a tightening method for reducing the variation in fastener tensions resulting from relaxation.

The use of threaded fasteners to connect materials together is well known. As used herein, threaded fasteners include: bolts and nuts, bolts received in tapped holes, studs with nuts, and the like. The fasteners and the elements that are fastened together are collectively termed a joint.

The compression of the joint and the tension along the shank of the threaded fastener affect the quality of the joint. In joints subject to shear, higher compression forces increase the shear resisting friction between the joint elements. Hence, increased fastener tension may be preferred as limited by the proof strength of the fastener. In joints subject to axial load, i.e., directed along the shank of the fastener, fastener tension must be limited so that the yield strength of the fastener is not exceeded under peak loads. Fluctuating axial loads, which may induce fatigue in the fastener, place different limits on the optimal tension in the fastener.

Fastener tension is difficult to measure directly. Instrumented bolts, load washers and certain ultrasonic techniques have all been used to provide essentially direct indications of fastener tension, however, these techniques are expensive or time consuming and generally not feasible in production environments. Fastener tension is instead, more typically deduced from measurements of fastener torque, such as in "torque control methods" or measurements of the angle of rotation of the fastener, such as in "turn-of-the-nut methods". Both fastener torque and angle of rotation can be easily observed during the assembly of the joint.

The relationship between fastener torque and tension is highly dependant on the coefficient of friction between the fastener and the elements of the joint to be fastened. This coefficient of friction varies considerably between joints for reasons including variations in surface coatings or lubrication of the fastener as well as imperfections in the fastener threads.

The relationship between angle of rotation of the fastener and the fastener tension is correspondingly dependant on the relative stiffness of the joint elements and the fastener, quantities that also vary considerably between joints.

The effects on these variations in joint friction and stiffness may be reduced by sophisticated combinations of torque and angle measurement. For example, the logarithmic rate method ("LRM") measures the change of torque with angle during the tightening of the fastener and thereby estimates the effects of friction and joint stiffness. The LRM method is described in a paper by S. Eshghy entitled: "The LRM Fastening System" (AD77-716), published by the Society of Manufacturing Engineers, Dearborn, Michigan. U.S. Pat. No. 4,245,381 entitled: "Tension Control of Fasteners", issued Jan. 20, 1981, and incorporated by reference, also provides a detailed description of LRM fastening system as well as descriptions of the above mentioned torque control and turn-of-the-nut fastener tightening methods.

In situations where a joint is assembled with multiple fasteners, uniformity of fastener tension is also critical. Uniform fastener tension prevents distortion of the joint elements and ensures that each fastener efficiently shares the load placed on the joint. Sophisticated fastener tightening schedules, such as LRM, improve uniformity of fastener tension by increasing the accuracy of fastener tension under variations in joint friction and stiffness.

It is known in the art that fasteners that have been assembled under tension in a joint will experience a tension loss over time. This tension loss is termed "relaxation" and is manifested in a corresponding loss of torque which may be detected by a procedure referred to as a "static audit". In a static audit, torque is reapplied to a previously tightened fastener some time after the fastener was initially tightened. The maximum torque measured during the audit is considered to be the "static torque". As used herein, static torque is defined as the resistive torque exhibited by a fastener turning at an arbitrarily low reference speed. The maximum torque observed just before the fastener resumes motion is termed the "breakaway torque". As a result of varying degrees of relaxation, therefore, the static torque measured in the static audit will frequently vary considerably among identically tightened fasteners.

Tension relaxation appears to have two components which may be termed: "quick relaxation" and "time relaxation". Quick relaxation occurs very shortly after the applied torque is removed from the fastener 36 and is thought to result from a slight unwinding of the fastener 36 produced from relaxation of torsional stress in the fastener shank. Second order elasticity terms in the elasticity of the fastener shank, as opposed to the first order term of Hook's law, may also produce this loss of tension with loss of torsion.

Time relaxation occurs over a longer period of time and is believed to be caused by plastic flow or creep of the joint 34 materials themselves, including gasket 42, and may occur over the span of several minutes to several days.

Various methods have been proposed to reduce relaxation of fastener tension. In one approach a pulsed application of a recovery torque equal to the dynamic torque of the fastener, follows immediately after the initial fastener tightening. Dynamic torque, as used herein, will be defined as the final torque achieved in the initial tightening of the fastener yet while the fastener is still turning at a tightening speed which is substantially higher than the previously mentioned reference speed of the static audit.

The above described pulsed application of a recovery torque equal to the dynamic torque is not effective in situations where the dynamic torque is substantially below the breakaway torque of the fastener, the latter which may remain high even as the joint tension relaxes. In such instances, the tension of the fastener is unaffected by the pulsed recovery torque.

A static audit is ordinarily conducted with a hand-held torque wrench. The torque on the fastener is slowly increased until the fastener breaks free. The maximum torque on the wrench is then recorded. Measurements of static torque will vary depending on the speed with which the fastener is turned and the distance it travels, neither of which may be easily controlled by hand. Joints that break violently, or very hard joints requiring large torques (200 Nm or greater) can be difficult to audit by hand. Operator fatigue may lead to errors. Also the torque wrench only records only a single peak torque, so it cannot be determined whether the breakaway torque or the torque rise due to angular advance was measured.

SUMMARY OF THE INVENTION

The present invention relates to a tightening method that includes a torque recovery cycle appended to the end of an initial tightening cycle of a threaded fastener.

At the end of the tightening cycle and after a short relaxation time during which no torque is applied to the fastener, the fastener is rotated through a small angle to "break" the joint. A static audit subsequently performed on the fasteners reveals reduced scatter in the measured static torque.

It is accordingly one object of the invention to reduce the variation in torque as measured by a later static audit. If a tension control method such as LRM is used in the initial tightening of the fastener, the reduced variations of static torque will correspond to a reduced variation in the tension of fasteners.

The breaking of the joint is ensured by measuring the dynamic torque last applied to the fastener during the initial tightening cycle. After the relaxation time, an increasing torque is applied to the fastener and this torque is periodically sampled. When a predetermined number of torque samples measure higher than the dynamic torque last applied to the fastener, the fastener is rotated through an additional predetermined angle.

It is another object of the invention, therefore, to provide a simple means for ensuring that a joint breaks, but does not continue to turn too far, such means being suitable for use with instrumented nutrunners and the like. This method of ensuring that the joint breaks also ensures that fasteners with low torques are retorqued to at least the dynamic torque.

The torque recovery cycle is performed at a low reference speed, and torque and angle data are sampled and stored. From these samples, a point of minimum curvature between adjacent samples may be determined. The highest torque sample following a predetermined number of samples after this point of minimum curvature is recorded as the static torque value. This method eliminates reporting the breakaway torque which could be substantially higher than the torque values that follow.

It is thus another object of the invention to provide a means for auditing a joint made with an instrumented nutrunner which may effectively distinguish breakaway torque from static torque and which allows for more reproducible static torque.

Other objects and advantages besides those discussed above shall be apparent, to those experienced in the art, from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

BRIEF DESCRIPTION OF THE DRAWINGS

FIG. 1 is a block diagram of an instrumented nutrunner and its associated control circuitry, suitable for practice of the present invention, showing the measurement of fastener angle, torque and tension;

FIG. 2 is an illustration of a torque-angle curve generated during an initial fastener tightening cycle and a torque recovery cycle, showing dynamic torque $T_d$, breakaway torque $T_b$ and minimum static torque $T_{sa}$;

DETAILED DESCRIPTION OF THE PREFERRED EMBODIMENT

Figure 3:
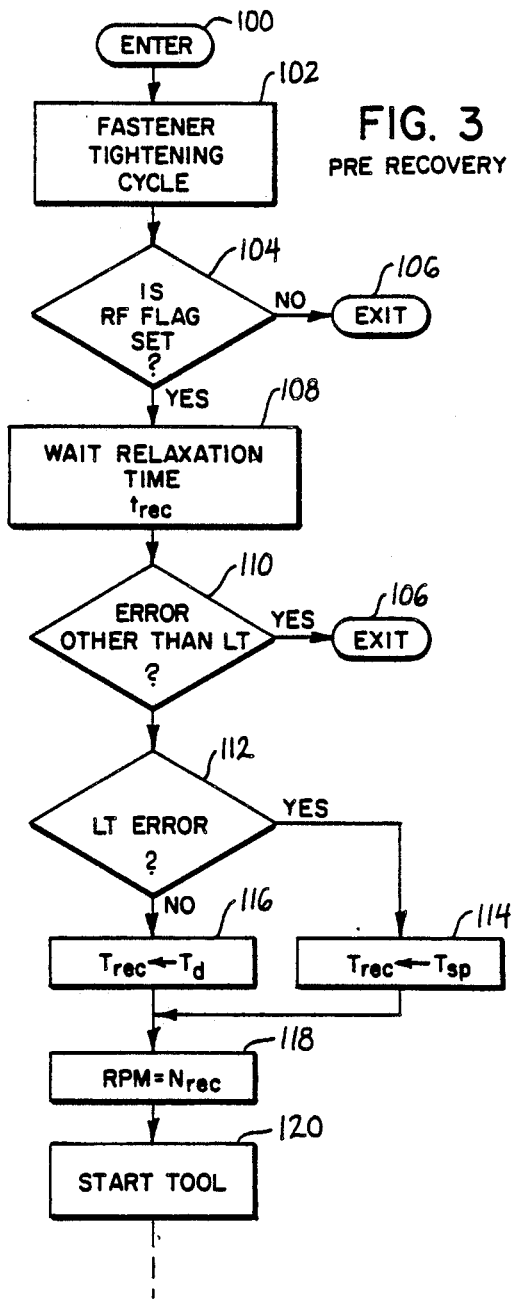
FIG. 3 is a flow chart of the prerecovery portion of the method of the present invention as executed by the spindle module of FIG. 1.

Referring to FIG. 1, a joint 34 is comprised of a bolt 36 extending through a hole in a top plate 40 and received by a threaded hole in a chassis 44. Sandwiched between the top plate 40 and the chassis 44 is, in some applications, a gasket 42. The head of the bolt 36 is received by a socket 38 attached to an instrumented electric nutrunner 10, of a type commercially available and to be described below.

The nutrunner 10, suitable for practice of the present invention, includes a brushless DC motor 12 controlled by motor controller 22. Motor controller 22 applies power from power supply 24 to the motor 12 windings (not shown) according to rotor position signals 18 received from a resolver 16 connected to one end of the motor 12 by shaft 25. The rotor position signal 18 may be processed by the motor controller 22 to produce a tachometer signal to provide feedback control of the speed of the nutrunner 10 as is understood in the art.

The other end of the motor 12 is connected by shaft 25 to the nutrunner socket 38 through a torque transducer/reduction gearbox 14 which provides a torque signal 20 from a strain gauge torque sensor (not shown) incorporated in the torque transducer/reduction gearbox 14 and produces a digital angle signal 9 via an angle encoder (also not shown). The torque signal 20 and the digital angle signal 19 are transmitted to the spindle module 26.

The torque transducer/reduction gearbox 14 also reduces the relative speed of the rotation of socket 38 with respect to the motor shaft 25 by means of a planetary gear train (not shown).

The resolution of the angle signal 19 varies between approximately 0.1 and 2.0 degrees of socket 38 rotation depending on the gearing of the planetary gear train incorporated into the torque transducer/reduction gearbox 4 and the desired value as imput to the station controller 28. The digital angle signal 19 is produced by a hall effect magnetic sensor as is understood in the art.

The spindle module 26 interprets, samples and stores the torque and angle signals 20 and 19 respectively. The spindle module 26 contains a 68000 CMOS microprocessor manufactured by Motorola, 16 kilobytes of static random access memory ("SRAM") for torque and angle data storage, and 64 kilobytes of erasable programmable read only memory ("EPROM") for program instruction. In addition, the spindle module 26 contains 2 kilobytes of non-volatile random access memory ("RAM") for parameter storage to be described below.

The spindle module 26 receives instructions from a station controller module 28 through a "down load" process. The spindle module 26 controls the fastener tightening cycle and the torque recovery cycle by means of a program, described below only with respect to the torque recovery cycle. The fastener tightening cycle and torque recovery cycle program receive inputs of fastener torque and angle from the nutrunner 10.

The station controller module 28 also incorporates a CMOS 68000 microprocessor, 192 kilobytes of non volatile RAM and 512 kilobytes of EPROM for program storage as is generally understood in the art. In addition, the station controller module 28 has two RS-232 serial ports for connecting to configuration terminals 30 and an RS-485 port for linking the station controller module 28 to a network 32 to provide fastening data access from remote terminals 30. The configuration terminal 30 may be used by an operator to select various tightening and torque recovery parameters, the latter to be discussed below.

It will be apparent to one skilled in the art, from the following discussion, that the present invention may be performed on a variety of programmable fastening systems including those using pneumatic or other types of nutrunners, provided the nutrunner may be properly instrumented to provide the required torque and angle measurements.

Referring to FIG. 2, an example torque-angle curve for an initial fastener tightening cycle and torque recovery cycle is shown. The initial tightening of the fastener 36, represented by curve 46, shows a general upward slope as the torque increases with increasing turn of the fastener 36. This increasing torque results, principally, from the increasing compression of the joint 34. Depending on the characteristics of the joint 34 and the tightening strategy, the rotation of the fastener 36 will stop at some angle 50 and at some dynamic torque, $T_d$, at or near a target or set point torque $T_{sp}$. The dynamic torque $T_d$, as before, is defined as the resistive torque counteracting the torque of the nutrunner 10 at typical production tightening speeds. The initial tightening cycle may be performed under any of a variety of methods including torque control, turn-of-the-nut, and the LRM systems referred to above.

After the initial tightening cycle is complete, the motor 12 is turned off thus ceasing application of torque to the fastener 36. A relaxation time is then allowed to elapse. The relaxation time cannot be shown in the plot of FIG. 2 which has angle rather than time as the dimension of its horizontal axis.

Following the relaxation time, torque is re-applied to the fastener 36 as represented by curve 48. The initial portion of curve 48 represents nutrunner 10 "wind-up" and corresponds to the elastic deflection of the nutrunner 10 transmission components under torsional stress. During this wind-up, the fastener 36 is not moving, however the windup causes the angle encoder 14 to register a slight angular advance. Immediately following a break away torque value $T_b$ the fastener 36 begins to move and the torque drops to a minimum static value $T_{sO}$. As noted before, the static torque is the fastener's resistive torque at a low reference rotational speed that is much lower than the tightening speed producing $T_d$. The static torque $T_{sO}$ is defined at angle O, the angle at which the fastener begins to move after breakaway torque $T_b$. This definition reflects the fact that static torque will continue to increase with increasing fastener rotation.

Although $T_{sO}$ is shown lower than $T_b$, in some cases, $T_{sO}$ will be equal to $T_b$. $T_{sO}$ also is shown lower than $T_d$, in part, as a result of relaxation of the joint. As a general rule, if there is no relaxation the converse will be true: the dynamic torque $T_d$ will be lower than the static torque $T_s$.

After the joint 34 is broken, at angle 0, defined above as the point at which the fastener begins to move again following the breakaway torque $T_b$, the torque rapidly increases over the next few degrees of fastener rotation to a peak static torque value $T_{s\alpha}$. Again, the static torque $T_{s\alpha}$ is defined in terms of an angle $\alpha$ reflecting the fact that static torque will continue to increase with increasing fastener rotation.

It has been determined that the process of breaking the joint 34 after a short period of relaxation, on the order of 2 to 5 seconds, will substantially reduce the scatter of fastener torques as may be subsequently measured by a static audit. The reduction in torque scatter produces a corresponding reduction of tension scatter in the fasteners 36 if the fasteners are initially tightened by a tension control method such as LRM. This reduction in torque scatter is produced both for hard joints without gaskets and for soft joints, such as the gasketed joint 34, although the improvement is less with soft joints.

In a torque recovery cycle embodying this principle of breaking the joint 34 it is important that in breaking the joint, the fastener be moved by the minimum angle necessary. Excess movement of the fastener may unacceptably increase fastener tension on hard joints and may reintroduce the scatter of static torques among fasteners 36.

The detection of the instant at which the joint breaks is complicated by the small angular motion of the fastener 36 during the joint breaking and by the torsional deflection between the fastener 36 and the angle encoder 16 that is inevitable in a production nutrunner 10. Nevertheless, it has been determined that the breaking of a joint may be performed by measuring the torque and angle of the fastener 36 during the torque recovery cycle.

The torque recovery cycle of the present invention is controlled by a program running on the spindle module 26, with input torque and angle data from the nutrunner 10 as processed by the spindle module 26, and with parameters input by the operator through configuration terminal 30.

Referring to FIG. 3, the torque recovery cycle starts after the initial fastener tightening cycle of the joint 34 as represented by process block 102. This initial tightening cycle 102 may be performed according to any number of methods known in the art including torque control, turn-of-the-nut and LRM, as previously described, provided that the final dynamic torque value $T_d$, reached by the fastener 34, may be measured.

After the fastener tightening cycle 102 is complete, a recovery flag is examined to see if torque recovery should be executed. The torque recovery cycle is optional and may be omitted in situations where little advantage is derived. The torque recovery flag is stored in the station controller module memory and may be set or reset by command from the operator via the configuration terminal 30.

If the recovery flag is set and therefore torque recovery has been requested, the torque recovery program proceeds to process block 108. At process block 108, the program waits for a length of time equal to a relaxation time parameter $t_{rec}$, which may be set by the operator. Longer periods $t_{rec}$ are preferable, all else being equal, as they allow more time for relaxation to occur and hence allow more complete torque recovery. Shorter periods $t_{rec}$, however, may be required to maintain practical production rates because $t_{rec}$ directly affects cycle time. As noted, however, significant reductions in torque scatter may be obtained with a $t_{rec}$ value of 2 to 5 seconds.

If the recovery flag is not set, the program exits as indicated by exit block 106.

After the relaxation time $t_{rec}$ has passed, during which time no torque is applied to the fastener 36, any error flags that were set in the fastener tightening cycle 102 are inspected. The error flags are stored in the spindle module 26 and if set indicate that an error occurred in the fastener tightening cycle. The particular errors that are possible depend on the tightening strategy adopted in process block 102 but may include, for example, indications of: cross threading of the fastener 36 or metal chips in the threads causing galling; collapse of the joint 34 as in the case of a clevis joint; or a broken or missing fastener 36. Such errors are generally detected by observing the fastener tightening cycle torque-angle curve or "signature" according to methods known in the art. If an error has occurred, as determined by an examination of the error flags at decision block 110, the program is exited at process block 106, except if the error is one of "low final torque" alone. Most errors obviate the need for a torque recovery cycle, however, the error of low final torque may be remedied.

Per decision block 112, if the error was one of low final torque, a recovery torque variable $T_{rec}$ is set equal to the set point torque $T_{sp}$ used in the initial fastener tightening cycle 102, per process block 114. Otherwise, if there are no errors, the recovery torque variable $T_{rec}$ is set equal to the final dynamic torque $T_d$ experienced by the fastener in the initial tightening cycle 102, per process block 116 In certain tightening strategies, such as turn-of-the-nut, there is no $T_{sp}$ value produced. In these situations, there will be no corresponding low torque error. If there is, then $T_{sp}$ is defined as the minimum allowable torque $T_{rec}$.

$T_{rec}$ is used to identify the point at which the joint breaks, which is generally near $T_d$, the final torque value of the joint. If the joint torque is too low, torque recovery first re-torques the fastener 36 to the correct torque value and then adds the angle of advance $\alpha_{rec}$. Setting $T_{rec}$ equal to $T_{sp}$ accomplishes this torque correction as will be seen.

At process block 118, the maximum angular velocity of the nutrunner 10 is set equal to a recovery speed indicated by parameter $N_{rec}$ which again may be set by the operator. Generally $N_{rec}$ is chosen to be a low speed commensurate with the measurement of static rather than dynamic torque. $N_{rec}$ should be sufficiently low so that "impacting" and subsequent torque transients are minimized. A typical value for $N_{rec}$ is 5 rpm.

Figure 4:
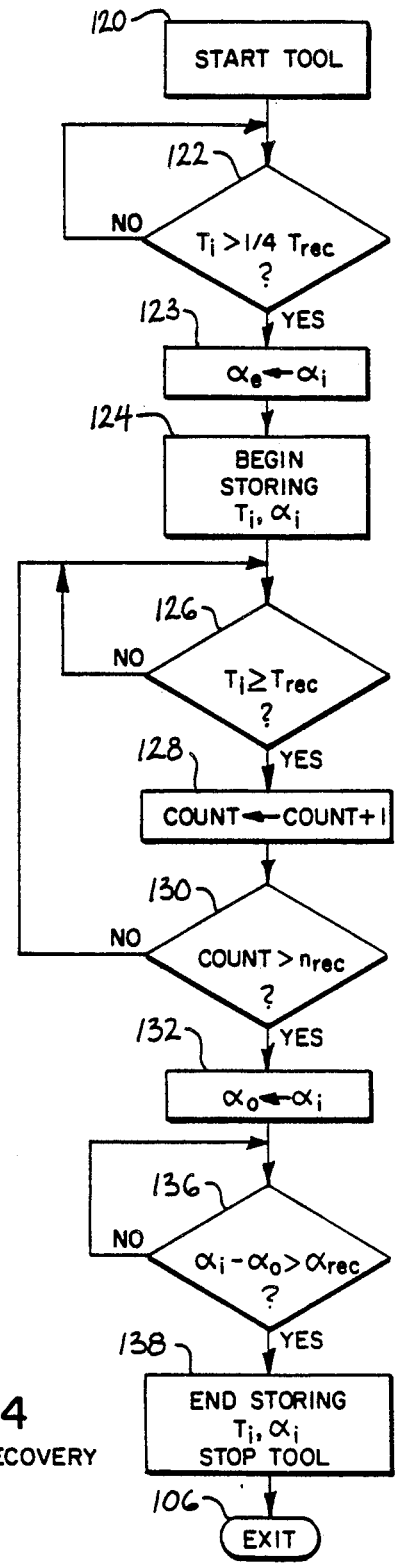
FIG. 4 is a flow chart of the torque recovery portion of the present invention as executed by the spindle module of FIG. 1.

After $N_{rec}$ is set, the nutrunner is energized per process block 120 to continue to turn in the direction of "tightening" of the fastener. Referring to FIG. 4, instantaneous torque values Ti from the torque transducer 14, as processed by the spindle module 26, are compared to a value equal to ¼ $T_{rec}$ per process block 122. If the values of $T_i$ do not exceed ¼ $T_{rec}$ within a given time as determined by a watchdog time value, the program exits (not shown). The watch dog time value prevents endless loops of the program in the event that the nutrunner 10 is no longer engaged with the fastener 36, for example. The frequency of the sampling of torque and angle values may be controlled by the operator but are generally equal to approximately one sample per 0.5 degrees.

Once the torque has climbed to a value equal to ¼ $T_{rec}$, the current angle of the fastener $\alpha_i$ is stored in variable $\alpha_e$ at process block 123. The variable $\alpha_e$, like the watch dog timer value is also used to prevent endless loops of the program at decision blocks 126, 130 and 136 discussed below. If the torque recovery cycle is not accomplished within 120° of $\alpha_e$ the program is exited under the assumption that either the joint is yielding or engagement is lost.

The torque values $T_i$ and angle values $\alpha_i$ are now stored in the spindle RAM per process block 124 for later processing to determine the static torque $T_{sa}$ as will be described below. The storing process is carried on as a background task (not shown in FIG. 4) and includes the comparison of values $\alpha_i$ to $\alpha_e$ to detect endless loops of the program as described above.

At process block 128, a count variable, previously set to zero, is incremented for each time a torque sample $T_i$ equals or exceeds $T_{rec}$. At decision block 130, this count variable is compared to a parameter $n_{rec}$ and if count is less than $n_{rec}$ then the program loops back to decision block 126 to evaluate the next torque sample $T_i$. Decision block 30, therefore, evaluates the number of samples $T_i$ which have had values greater than $T_{rec}$. Note that the samples $T_i$ need not be consecutive.

The requirement that $n_{rec}$ number of torque samples $T_i$ be greater than $T_{rec}$ before the program advances is intended to confirm that all relaxation is taken up before advancing by $\alpha_{rec}$. The parameter $n_{rec}$ has a typical value of three but this value may be changed by the operator through the configuration terminal 30 depending on the characteristics of the torque-angle curve produced by the joint 34.

If less than $n_{rec}$ torque values Ti greater than $T_{rec}$ have been observed then the program loops back to decision block 126 to evaluate the next torque sample $T_i$. Otherwise, the program proceeds to process block 132 and the current angular position of the fastener $\alpha_i$ is stored at $\alpha_0$. The variable $\alpha_0$ is the angular reference point for breaking the joint 34.

Figure 6:
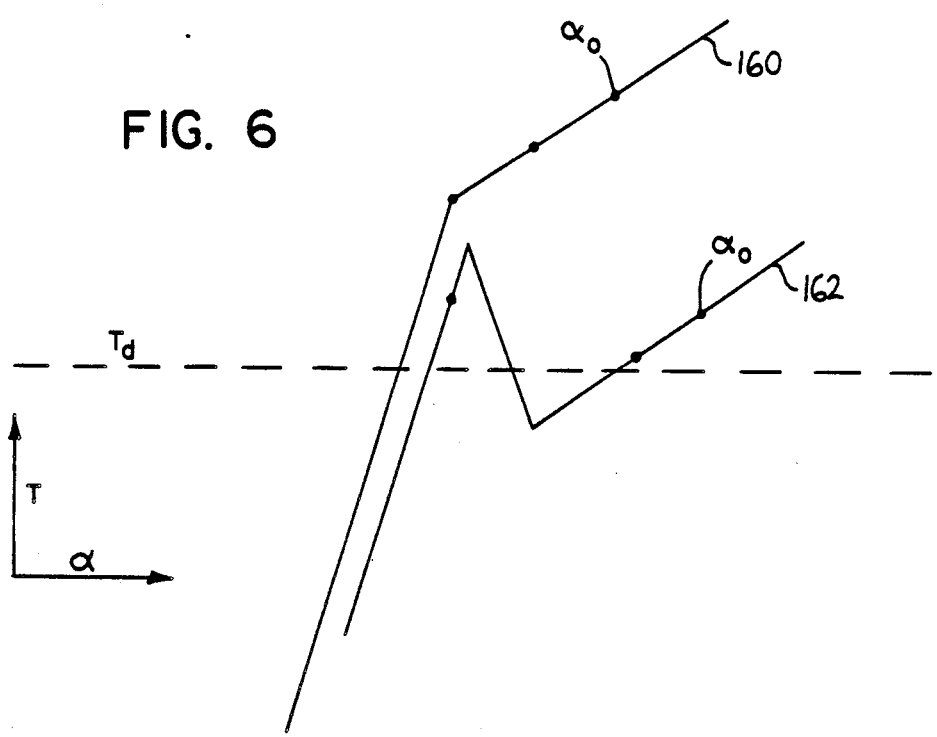
FIG. 6 is an illustration of a series of torque-angle curves similar to that of FIG. 2, enlarged to show the portion of the torque recovery cycle near the fastener break point and showing the determination of the initial angle $\alpha_0$ for various joint types.

Referring to FIG. 6, the torque-angle curves 160 and 162 of two example joints are shown. The points at which torque and angle samples $T_i$ and $\alpha_i$ are taken are shown by dots and the points $\alpha_0$ for these curves are also shown. Per the above program, $\alpha_0$ is assigned to the third point where $T_i$ is greater than $T_d$ regardless of whether there are intervening points $T_i$ less than $T_d$.

At process block 136, the difference between $\alpha_0$ and the current $\alpha_i$ is evaluated. If this difference is greater than $\alpha_{rec}$ then the nutrunner 10 is deenergized and the torque recovery cycle is complete per process block 138. If the difference between $\alpha_0$ and the current $\alpha_i$ is less than parameter $\alpha_{rec}$ then the nutrunner motion is continued. The net effect is that the nutrunner advances by angle $\alpha_{rec}$ after $n_{rec}$ torque samples $T_i$ have exceeded $T_{rec}$. A typical value for $\alpha_{rec}$ is 3°, however this value may be changed by the operator by means of configuration console 30. Generally $\alpha_{rec}$ should be as small a value as possible that ensures that the joint 34 will break. This value will vary depending on the joint characteristics, but typically ranges from 1° to 6°.

The "n" samples of torque and angle data $T_i$ and $\alpha_i$ acquired in the torque recovery cycle are stored for determining the static torque of the joint $T_{sa}$ for quality control purposes.

Figure 5:
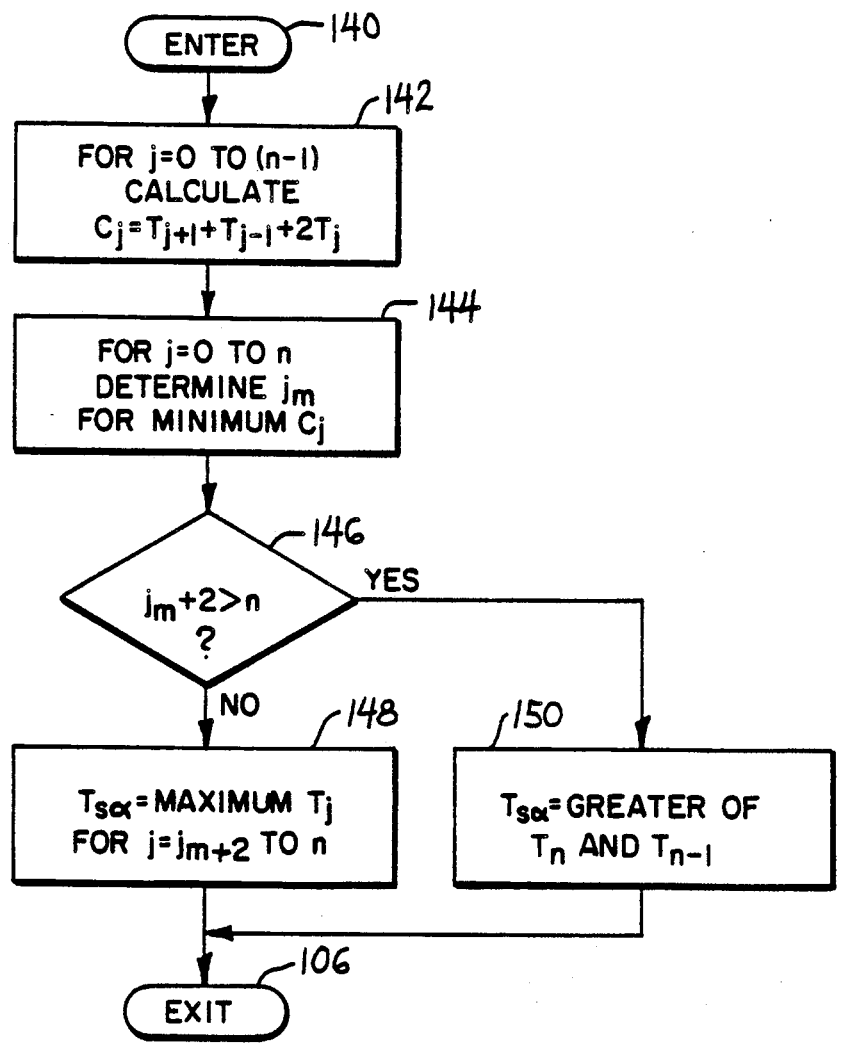
FIG. 5 is a flow chart of the calculation of static torque from data collected during the torque recovery procedure of FIG. 4 as executed by the spindle module of FIG. 1 and reported by the station controller.

The calculation of the static torque $T_{sa}$ is also performed by a program executed by the spindle module 26. Referring to FIG. 5, in the first step of the static torque calculation, shown in process block 142, a curvature value $C_j$ is calculated for each data point $T_i$ occurring at $\alpha_i$ according to the following equation:

$$C_j = T_{j-1} + T_{j+1} - 2T_j. \quad (1)$$

where j is an index value from 0 to n-1 corresponding to the order in which the samples were acquired.

Once all $C_j$ values are calculated, the index value "$j_m$" corresponding to the minimum curvature $C_j$ is determined per process block 144. The curvature value $C_j$ may be understood to be a discrete point equivalent to the second derivative of torque with respect to angle:

$$\frac{d^2T}{d\alpha^2}.$$

Figure 7:
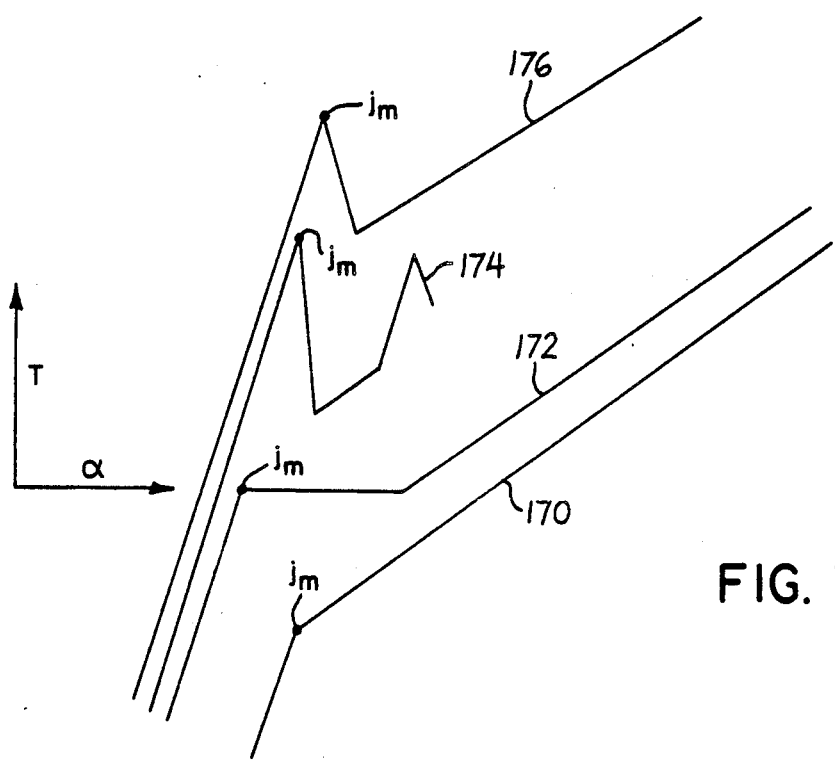
FIG. 7 is an illustration of a series of torque-angle curves similar to that of FIG. 2, enlarged to show the portion of the torque recovery cycle near the fastener break point and illustrating the point $j_m$ of minimum curvature $C_j$ for various joint types.

If the torque-angle curve near $T_j$ is concave in a downward direction, the $C_j$ associated with $T_j$ will be negative. If the torque-angle curve near $T_j$ is concave in an upward direction, the $C_j$ associated with $T_j$ will be positive. Sharper bends in the torque-angle curve will have higher-magnitude $C_j$ values. Referring to FIG. 7, the point of minimum curvature, considering the sign as well as the magnitude of the curvature $C_j$, is shown for three example torque-angle curves near the point at which the joint 34 breaks. Curve 170 shows a joint 34 exhibiting a steady increase in torque with angle. The point of minimum curvature $j_m$ is at the transition between high slope and low slope, or the "kink", on this curve.

Torque-angle curve 176 is representative of a more typical joint where the torque increases to the breakpoint and then decreases again finally rising slowly. The point of minimum curvature $j_m$ for this curve is the local torque maximum between the rising and falling sections of the curve.

When a joint breaks, certain slip-sticking or chattering may occur depending on the fastener and joint elements. Curve 174 shows a torque angle curve with slip sticking: an undulating curve with several local maxima. Here the sharpest local maximum will be the point of minimum curvature $j_m$. This latter type of curve 174 may not yield consistent static torque measurements under the present method, however it may be possible to reduce tool recovery speed $N_{rec}$ to reduce such chattering.

Once the index value of minimum curvature $j_m$ is found, it is evaluated to determine its location within the sample points. If $j_{m+2}$ is less than or equal to the total number of sampled points "n", as evaluated per decision block 146, then the static torque $T_{sa}$ is set equal to the maximum torque sample $T_i$ following index value $j_{m+2}$ as indicated by process block 150. On the other hand, if $j_{m+2}$ is greater than the total number of sampled points "n", then the static torque $T_{sa}$ is assigned the maximum torque of $T_{n-1}$ and $T_n$, the last two sampled torque values, as indicated by process block 148. The reason for this method of peak torque detection is to exclude the breakaway which is not a good indication of the initial torque applied.

EXAMPLES

1. The following improvements in torque scatter were realized on a $\frac{1}{2}'' \times 13$ (1.70" grip) in hard and gasketed joints tightened to an initial torque by a torque control method and then subjected to torque recovery according to the present invention with $t_{rec} = 3$ sec and $\alpha_{rec} = 2°$ in one series of tests. Another series of tests were run without performing torque recovery.

Static to dynamic torque ratios ($T_{sa}/T_d$) in a series of tests with and without the torque recovery method of the present invention are summarized in Tables 1 and 2, below:

TABLE 1

Static to dynamic torque rations for a hard joint

|  | Without Torque Recovery | With Torque Recovery |
|---|---|---|
| sample size | 27 | 27 |
| mean | 1.112 | 1.096 |
| standard deviation | 0.0417 | 0.0113 |
| range (high–low) | 0.186 | 0.055 |

The improvement in scatter as represented by the standard deviation is 3.69:1, and 3.38:1 as represented by the range.

TABLE 2

Static to dynamic torque rations for a gasketed joint

|  | Without Torque Recovery | With Torque Recovery |
|---|---|---|
| sample size | 28 | 28 |
| mean | 0.996 | 1.051 |
| standard deviation | 0.0276 | 0.0165 |
| range (high–low) | 0.097 | 0.060 |

The improvement in scatter as represented by the standard deviation is 1.67:1 and 1.62:1 as represented by the range.

The above description has been that of a preferred embodiment of the present invention. It will occur to those who practice the art that many modifications may be made without departing from the spirit and scope of the invention. In order to apprise the public of the various embodiments that may fall within the scope of the invention, the following claims are made.

I claim:

1. A method of tightening a threaded fastener in a joint that may experience relaxation of tension with time to produce a desired tension related to a dynamic torque $T_d$, using a nutrunner including means for sensing the values of the torque applied to the threaded fastener and the angle of rotation of the threaded fastener comprising the steps of:
   (a) applying torque to the fastener for advancing the fastener with respect to the joint;
   (b) ceasing the application of torque to the fastener at the dynamic torque level $T_d$;

(c) waiting a relaxation time $t_{rec}$ without the application of torque to the fastener; and (d) reapplying torque to the fastener until the fastener first advances with respect to the joint after the reapplied torque.

2. The method of claim 1 where $T_d$ is determined by the LRM method.

3. The method of claim 1 wherein step (d) is performed by the steps of:

reapplying torque to the fastener;

periodically sampling the values of the torque applied to the fastener;

waiting for a predetermined number of torque samples $n_{rec}$ that measure greater than the dynamic torque level $T_d$; and advancing the fastener by a recovery angle $\alpha_{rec}$ after the predetermined number of torque sample $n_{rec}$ measuring greater than the dynamic torque level $T_d$ have been received.

4. The method of claim 3 the angular velocity of the nutrunner is limited to a recovery speed $N_{rec}$.

5. The method of claim 3 wherein the recovery angle $\alpha_{rec}$ is less than 10 degrees.

6. A method of auditing the torque of a tightened threaded fastener in a joint using a power wrench including means for sensing the values of the torque applied to the threaded fastener and the angle of rotation of the threaded fastener comprising the steps of:

advancing the tightened threaded fastener with respect to the joint;

periodically sampling and recording the values of the torque applied to the fastener;

calculating the curvature value $C_j$ associated with each sampled value of the torque;

finding the minimum curvature value associated with a sampled value of torque; and recording the highest torque value sampled after a predetermined number of samples after the sampled value of the torque associated with the minimum curvature.

7. A method of auditing the torque of a tightened threaded fastener in a joint to produce a desired tension related to a dynamic torque $T_d$, using a power wrench including means for sensing the values of the torque applied to the threaded fastener and the angle of rotation of the threaded fastener, comprising the steps of:

applying torque to the fastener to advance the fastener at a predetermined speed;

periodically sampling and recording the values of the torque applied to the fastener;

waiting for a predetermined number of torque samples that measure greater than the dynamic torque $T_d$;

advancing the fastener by a recovery angle $\alpha_{rec}$ after the predetermined number of torque samples that measure greater than the dynamic torque level;

calculating the curvature $C_j$ value associated with each sampled value of the torque;

finding the minimum curvature value between the torque samples; and recording the highest torque sampled after a predetermined number of samples after the sampled value of the torque associated with the minimum curvature.

8. A method of retightening a threaded fastener initially tightened to a torque of $T_d$ that may be less than a target torque $T_{sp}$, using a nutrunner including means for sensing the the values of the torque applied to the threaded fastener and the angle of rotation of the threaded fastener comprising the steps of:

(a) setting a torque error flag if the torque $T_d$ was less than the target torque $T_{sp}$;

(b) applying torque to the fastener for advancing the same;

(c) periodically sampling the values of the torque applied to the fastener;

(c) if the torque error flag is set, waiting for a predetermined number of torque samples $n_{rec}$ that measure greater than the target torque $T_{sp}$;

(d) if the torque error flag is not set, waiting for a predetermined number of torque samples $n_{rec}$ that measure greater than the torque $T_d$; and (e) advancing the fastener by a recovery angle $\alpha_{rec}$ after the predetermined number of torque samples $n_{rec}$.

* * * * *

UNITED STATES PATENT AND TRADEMARK OFFICE
CERTIFICATE OF CORRECTION

PATENT NO. : 4,995,145

DATED : February 26, 1991

INVENTOR(S) : Siavash Eshghy

It is certified that error appears in the above-identified patent and that said Letters Patent is hereby corrected as shown below:

Col. 4, line 51   "signal 9" should be --signal 19--.

Col. 4, line 63   "gearbox 4" should be --gearbox 14--.

Col. 8, line 54   "f0r" should be --for--.

Signed and Sealed this

Twenty-eighth Day of July, 1992

*Attest:*

DOUGLAS B. COMER

*Attesting Officer*    Acting Commissioner of Patents and Trademarks